Sept. 23, 1958     A. F. ERICKSON     2,852,964
BORING TOOL
Filed June 4, 1954     2 Sheets-Sheet 1
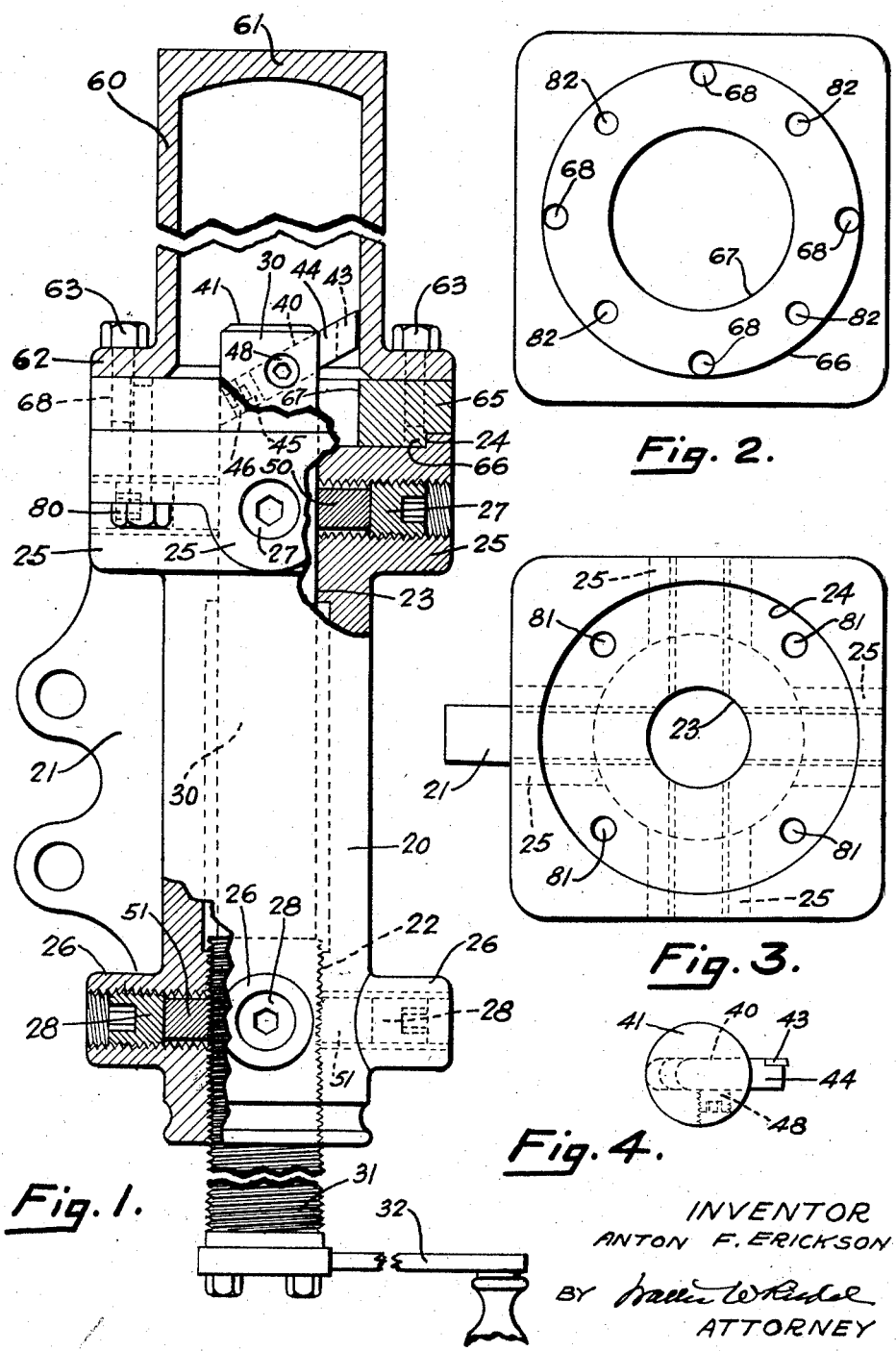

Sept. 23, 1958     A. F. ERICKSON     2,852,964
BORING TOOL

Filed June 4, 1954     2 Sheets-Sheet 2

INVENTOR
ANTON F. ERICKSON
BY
ATTORNEY 2,852,964
Patented Sept. 23, 1958

2,852,964

BORING TOOL

Anton F. Erickson, Dayton, Ohio

Application June 4, 1954, Serial No. 434,387

4 Claims. (Cl. 77—2)

This invention relates to an improved boring tool or fixture.

It is among the objects of the present invention to provide a rugged boring tool or fixture capable of boring or reboring any tubular member with the highest degree of precision. This boring tool or fixture is particularly designed and constructed to bore or rebore engine cylinders and particularly cylinders having an integral head portion.

A further object of the present invention is to provide a boring tool or fixture adapted to have the cylinder to be bored, attached thereto, said boring tool having a plurality of adjusting and holding members operative into radial engagement with the shaft that carries the cutting member of the tool. Operation of these members shifts the shaft and its cutting tool laterally to bring and hold said shaft into precise concentricity with the cylinder on the housing. This permits ordinary and inexpensive machine operations for the commercial production of the boring tool and thereby eliminates the necessity of costly and time consuming high precision machining operations on cooperating members of the boring tool. Limited tolerances in the clearance between the shaft and housing of the boring tool permit operation of the adjusting members to bring and hold the shaft into precise concentricity with the cylinder to be bored.

Further objects and advantages of the present invention will be apparent from the following description, reference being had to the accompanying drawings which illustrate a preferred form of construction.

In the drawings:

Fig. 1 is a side view of the fixture with a cylinder attached. Certain portions are broken away and shown in section to illustrate interior construction.

Fig. 2 is a bottom view of the adapter plate of the device.

Fig. 3 is a top end view of the fixture.

Fig. 4 is an end view of the movable cutting member.

Figure 5:
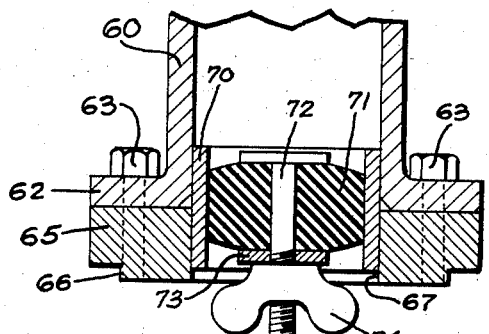
Fig. 5 is a sectional view showing the application and use of an auxiliary locating device during attachment of the cylinder to be bored to the adapter plate.

The boring tool or fixture of the present invention is particularly adapted to bore or rebore engine cylinders and particularly those having integral head portions in which precise boring to close proximity to the cylinder head is a difficult and expensive operation. This device will precisely bore the cylinder wall up to the point where the wall merges with the interior wall surface of the cylinder head.

The boring fixture of the present invention consists of an elongated, rigid and sturdy housing in which the movable cutting member is operatively supported. This movable cutting member, in the form of a shaft, is threadedly connected with the housing at its one end and rotatably and slidably supported by the housing at its other end. Thus as the shaft is rotated in the housing, it will move longitudinally of the housing. Means are provided at one end of the housing for locating and attaching a cylinder to be bored or rebored, said means precisely locating the cylinder in concentricity with the cutting tool. Thus this cutting tool must be concentric with said locating and attachment means.

To attain and then permanently retain such concentricity, it would be necessary in each tool or fixture to machine cut the co-operating threads within the housing and on the shaft and also the journal bearing within the housing and the shaft portion supported therein with the highest degree of precision so as to eliminate side-play between the shaft and housing. High precision machining is an extremely expensive and time consuming operation and would greatly increase the costs of commercial production of this device.

The device of the present invention is designed and constructed to eliminate the necessity of expensive, high precision machining operations because the cooperating threads and bearing portions of the shaft and housing may be ordinarily machined with limited clearance tolerance, allowing limited side-play between the shaft and housing. This side-play is taken up by adjusting and holding members on the housing which are operative to engage the shaft for adjusting and holding said shaft in concentricity with the means that locates and holds the cylinder to be ground or bored securely upon the housing. Thus eccentricity of the shaft relatively to the housing, due to ordinary machining operations, is readily remedied and precise concentricity is attained by the manipulation of the adjusting and holding means.

Referring to the drawings, the elongated housing 20, cylindrical in shape, has a flange 21 for attaching the fixture to any suitable rigid support. The housing 20 has a longitudinal through passage one end of which is interiorly threaded as at 22, the other end being plain and providing a journal bearing 23. The end surface of the housing at its journal bearing end, has an annular recess providing an annular wall 24, which is concentric with the bearing 23. Adjacent each end of the housing four equally spaced lugs extend radially therefrom. The lugs at the bearing end of the housing are numbered 25, while those at the threaded end of the housing are designated by the numeral 26. Each lug has an interiorly threaded through passage radial of the housing and containing a plug-screw of the well known Allen type. Plug-screws in lugs 25 are numbered 27, and those in lugs 26, are numbered 28.

The movable cutting member of the fixture consists of a shaft 30 supported in the housing passage and extending from each end thereof. Threads 31 are provided at one end of the shaft, said threads cooperating with the interior threads 22 in the housing. Any suitable operating means such as a crank 32 is attached to this end of the shaft. The end of the shaft opposite its threaded portion is plain cylindrical and is slidably and rotatably carried by the bearing 23. As stated before, limited clearance tolerances are permitted between cooperating surfaces of the shaft and housing and thus ordinary machining operations may be employed, greatly facilitating commercial production and reducing costs.

Figure 9:
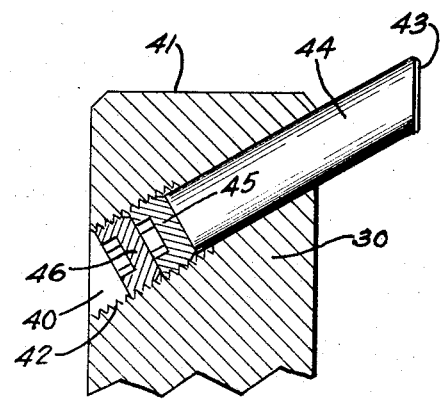
Fig. 9 is an enlarged view showing a portion of the movable cutting tool.

The plain end of the shaft 30, extending outside the housing 20 has a diametral through passage 40 which slopes relatively to the flat end surface 41 of said shaft, Screw threads 42 are provided in substantially one half the length of said passage 40 terminating more adjacent the flat end 41 of the shaft, the other half of said passage 40 being smooth walled, either round or multi-sided. This smooth walled part of passage 40 receives and supports the cutting tool 44, which has a hardened insert 43 at its outer end. The slope of passage 40 positions the cutting tool 44 so that its topmost cutting edge extends beyond the end surface of shaft 30 as shown in Fig. 9. This permits complete boring of a cylinder up to the inner wall of the cylinder head. An adjusting plug-screw 45 in the passage 40 is operative to adjust and hold the cutting tool 44 in proper radial extension relatively to shaft 30. A locking screw 46, always within the confines of the shaft surface, is operative to engage and lock screw 45 in the proper adjusted position. Another threaded passage, at right angles to passage 40, has a plug-screw 48 operative to engage the cutting tool 44 and securely lock it against outward movement relatively to the shaft.

Each plug-screw 27 and 28 in the housing has a member, preferably of a ductile material, interposed between it and the shaft. The drawings show these members to be in the form of a plug shiftably carried in the threaded passage containing the respective plug-screw. Plug-screws 27 each engage a ductile plug 50 and are operative to urge the respective plug into engagement with the plain portion of shaft 30. Plug-screws 28 each engage a ductile plug 51 and are operative to urge the respective plugs into engagement with the threaded portion 31 of said shaft.

Figure 8:
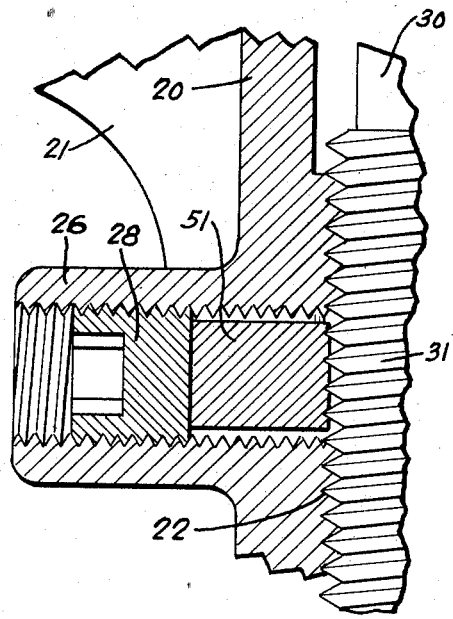
Fig. 8 is an enlarged view of a portion of the fixture shown in Fig. 1.
Figure 6:
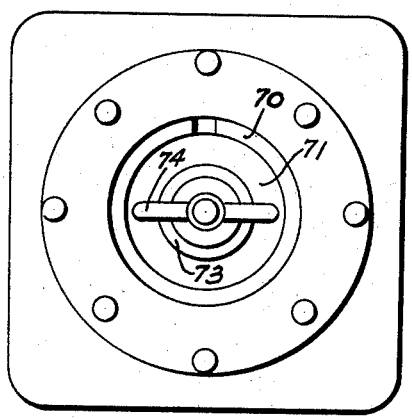
Fig. 6 is a bottom view of the adapter plate with the auxiliary locating device of Fig. 5, applied thereto.
Figure 7:
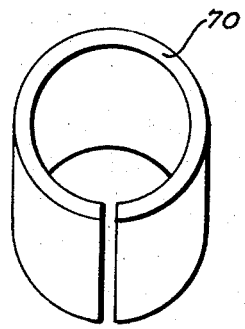
Fig. 7 is a view of the expansible collar of the auxiliary locating device shown in Fig. 5.

To facilitate commercial production of this fixture and materially reduce costs and production time, operatively engaging parts of the housing and shaft are machined ordinarily thus a certain amount of clearance or side-play between them will preclude necessary concentricity of said shaft and housing, especially the annular locating wall 24 on said housing. To compensate for this, the adjusting plug-screws 27 and 28 are operative to urge their respective plugs 50 and 51 into engagement with the plain and screwthreaded portions of the shaft 30, adjusting said shaft laterally until it is concentric with said locating wall 24 on the housing. Any suitable jig may be used between said shaft and wall to establish this concentricity. The plugs 50 and 51 will operatively hold and maintain the shaft concentric with said locating wall 24. The plugs are made of any suitable ductile material so that they will not damage the shaft as it is rotated and moves lengthwise in the housing. Metals such as lead, babbit or the like or any suitable plastic material having the desired characteristics may be used to make these plugs. The Fig. 8, shows a plug 51 engaging the shaft, the threads 31 on the shaft biting into the engaging surface of the plug. Plug 51 will hold the shaft against transverse or lateral movement and thus maintain concentricity, but it does not act as a feeder, moving the shaft longitudinally in response to rotation thereof. The screw threads in the housing perform this function. Any discrepancy in the concentricity of the shaft with the locating wall on the housing, which might occur accidentally or due to prolonged use of the fixture can readily be corrected by readjustment of the screw-plugs 27—50 and 28—51.

The cylinder 60, to be bored or rebored has an integral head 61, and an attachment flange 62 provided with openings to receive bolts 63. The cylinder may be attached to the boring fixture in any suitable manner, one requisite being that the inner cylinder wall be concentric with the shaft 30.

The fixture has an adapter plate 65 provided with an annular projection 66. The outer annular wall of this projection fits closely into the recess forming the annular wall 24 in the housing 20. A central opening 67 in the adapter plate 65 is concentric with the annular projection 66, thus when the adapter plate is placed in position upon the housing 20, this central opening will be concentric with the shaft 30.

The adapter plate 65 is attached to the cylinder by bolts 63 which pass through the openings in the cylinder flange 62 and threadedly engage openings 68 in the adapter plate. Any suitable jig or fixture may be used to align the opening 67 in the adapter plate with the interior wall of the cylinder 60. Fig. 5 shows a simple jig which is used for this purpose. This jig consists of a split ring 70 in which a rubber biscuit-like block 71 snugly fits. Block 71 has a headed bolt 72 forming a core therein, a washer 73 on said bolt being engagable by a wing-nut 74 on the bolt for compressing the rubber block to cause expansion of the split ring 70. The normal outer diameter of the split ring 70 is such that when the rubber block in said ring is fully expanded, the ring 70 will easily fit into the opening 67 of the adapter plate. It will likewise fit into the cylinder 60 inasmuch as the said opening and cylinder are of the same diameter. Fig. 5 shows the split ring 70 fitting into both the opening 67 and the cylinder on the adapter plate. Now the wing-nut 74 is operated to compress and expand the rubber block 71 resulting in expansion of the ring 70 which tightly grips and aligns the inner walls of the opening 67 and the cylinder 60. Opening 67 in the adapter plate being concentric with the annular wall of the projection 66 on said adapter plate, the interior wall of the cylinder 60 will now be concentric with said projection also. Bolts 63 are now used to fasten the cylinder to the adapter plate after which the jig is removed by operating the wing-nut to relax the rubber block, releasing the ring 70.

The adapter plate and its attached cylinder are now placed upon the housing so that the annular projection 66 on said plate fits into the annular recess defined by the annular wall 24 in the housing. Bolts 80 pass through openings 81 in the housing and are threadedly received by openings 82 in the adapter plate for securing said plate to the housing.

The threads 31 on shaft 30 are preferably 30 to the inch resulting in a substantially slow progressive inward movement of the shaft as it is rotated. This assures a comparatively smooth, burnished like surface within the cylinder. Inasmuch as the cutting face of the tool 44 and its hardened tip 43 extends beyond the outer end surface 41 of the shaft 30, the annular wall of the cylinder may be cleanly bored up to the merging area or line of the cylinder head and wall.

From the aforegoing it may be seen that the present invention presents a simple yet rugged tool or fixture capable of boring or reboring, particularly closed end cylinders with the highest degree of precision. This tool or fixture capable of doing high precision boring is, on the contrary, so designed and constructed that it may be produced commercially by ordinary, inexpensive machining operations thereby avoiding the extremely expensive and time consuming high precision machine operations required to produce such high precision tools.

What I claim is as follows:

1. A machine tool consisting of a one-piece housing having a cylindrical passage therethrough, one end portion of which is interiorly threaded, the opposite end portion is smooth; a one-piece shaft extending through and supported within said housing passage, said shaft having a threaded portion operatively engaging the said threaded portion of the passage and a smooth portion movably supported in said smooth portion of the cylindrical passage; rotating means attached to one end and a cutting tool attached to the other end of said shaft; a plurality of guide passages extending through the housing at and radially of the threaded and the smooth portions of the cylindrical passage and terminating therein; a bearing member made of ductile material and movably supported in each radial guide passage, certain of said bearing members being operatively engagable with the threaded and others with the smooth portion of the shaft and capable of substantially assuming the contours of the engaged shaft portions; and means in each radial guide passage for moving the bearing member therein.

2. A machine tool consisting of a one-piece housing having a cylindrical through passage one end portion of which is interiorly threaded, the other end portion providing a smooth bearing; a one-piece, solid shaft movably supported within said through passage, said shaft having a threaded portion operatively engaging the threaded portion of the through passage, and a smooth portion journalled in said smooth portion of the cylindrical passage; rotating means attached at the one end of the shaft and a cutting tool attached at its other end; a plurality of interiorly threaded guide passages in the housing, radially of the through passage, certain of said guide passages terminating in the said bearing portion and others in the threaded portion of said through passage; and an adjusting screw plug in each guide passage, engageable with a ductile bearing member movably supported therein, said plug being operative to adjust the respective bearing member relatively to the shaft portion engaged by said member and thereby transversely adjust the shaft for wear compensation.

3. A boring tool consisting of a one-piece housing having an elongated, continuous cylindrical passage providing a smooth bearing portion at its one end and an interiorly threaded portion at its other end; an annular recess in the end of the housing adjacent the smooth bearing portion therein, said recess being substantially concentric with the cylindrical passage; a one-piece shaft movably supported in the housing passage, journalled in the said bearing portion and threadedly engaging the interiorly threaded portion of said housing passage, said shaft having a driving member attached at its one end and a cutting tool at its other end; a plurality of interiorly threaded guide passages in the housing, radially of the cylindrical passage therein, certain of said guide passages opening into the said bearing portion and others into the said threaded portion of the cylindrical passage; a screw plug in each radial guide passage; and a bearing block inside each guide passage, interposed between the screw plug and the shaft, each bearing block being longitudinally movable within its respective guide passage into operative and adjusting engagement with the shaft by operation of its respective screw plug for maintaining precise concentricity between the shaft and the said annular recess.

4. A boring tool in accordance with claim 3, in which each bearing block consists of a ductile material which, when urged into direct engagement with the smooth and threaded portions of the shaft, will substantially conform to the contour of the shaft and operatively engage it, certain bearings threadedly and others as a supporting journal.

References Cited in the file of this patent

UNITED STATES PATENTS

| | | |
|---|---|---|
| Re. 15,916 | Flinchbaugh | Sept. 16, 1924 |
| 89,721 | Williams | May 4, 1869 |
| 111,768 | Norment | Feb. 14, 1871 |
| 865,548 | Ward | Sept. 10, 1907 |
| 1,654,219 | Houser | Dec. 27, 1927 |
| 1,698,394 | Davis | Jan. 8, 1929 |
| 2,359,210 | Engel | Sept. 26, 1944 |

FOREIGN PATENTS

| | | |
|---|---|---|
| 209,956 | Great Britain | Jan. 24, 1924 |